United States Patent Office 3,300,616
Patented Jan. 24, 1967

3,300,616
APPARATUS FOR THE RESISTANCE WELDING OF TUBES HELICALLY WOUND FROM METALLIC BANDS
Adalbert Sablotny, Hagen im Westphalia, and Werner Wennemann, Dortmund-Kirchhorde, Germany, assignors to Hoesch Aktiengesellschaft, Dortmund, Germany
Filed May 10, 1966, Ser. No. 549,609
Claims priority, application Germany, May 15, 1965, H 56,038
6 Claims. (Cl. 219—62)

Our invention relates to an apparatus for the resistance welding of tubes helically wound from a metallic band.

In the resistance welding of the helical seam of tubes formed by helically wound metallic bands alternating current is fed to longitudinal border portions of the band by contacts arranged near the welding spot at or close to the junction of the approaching narrow side faces of the band; the current flows along the band borders to the welding spot and heats the border areas of the band over a certain depth to welding temperature. The welding thus obtained with alternating current having a frequency up to 600 k.c.p.s. is better when higher frequencies are applied because then the field of the current (due to the skin effect) concentrates quite sharply in the said narrow side faces of the band.

In such welding of helically seamed tubes inequalities of heating are observed transversely over said longitudinal narrow side faces of the band destined to form the seam namely the highest heating being on the edges of said side faces which in the first phase of approachment are closest to each other while the temperature measured transversely over the band falls off toward the respective other edges. This effect appears particularly only at frequencies in the radio range, but then becomes so pronounced that near the welding spot only a narrow strip of each of the two narrow side faces will become redglowing while the remainder remains black. Thus a clean and reliable welding cannot be achieved and the defects can mostly not be repaired by additional manual welding.

We have now found that the beforesaid disadvantages in the resistance welding of helically seamed pipes by alternating welding current of radio frequency can be overcome by branching off capacitive current from the outer zone of the side face of the incoming band and from the inner zone of the side face of the already wound band and leading them towards the outer surface of the wound band and the inner surface of the incoming band, respectively. The entire welding current is thus divided into a first or main branch directly reaching the weld and a second branch which locally heats the narrow side faces of the metallic band before they contact in the welding spot. The said second capacitively branched off current equalizes the uneven distribution of temperature and the uneven heating as was shown in practice. Behind the spot where the second partial current branches off the narrow side faces of the metallic band are brightly red over their entire width and welding conditions are as favorable as in the welding of longitudinally extending tube seams.

An apparatus particularly suited to carry out our new welding method provides in a plane cutting through both welding surfaces additional electrical conducting means which are disposed so that they form together with the remotest material zones of the incoming and the wound band a ring of such great, primarily capacitive impedance that the current reaching the weld is not substantially weakened.

The said and other objects of our invention will be more fully understood when read with the accompanying drawing. It should be noted, however, that the effect achieved by our invention, though reliably proven by practice, cannot be scientifically explained in convincing manner at this time; it may be assumed that it is the final result of several electrical and possible magnetic effects. As known, in the field of radio frequency the strength of electrical and magnetic fields caused by voltages and currents is substantial and this results in certain fields of the electrical potential; additionally, the fields of the vector of current density have to be considered. Thus, very complicated mutual relationships exist which so far could not be investigated.

Figure 7:
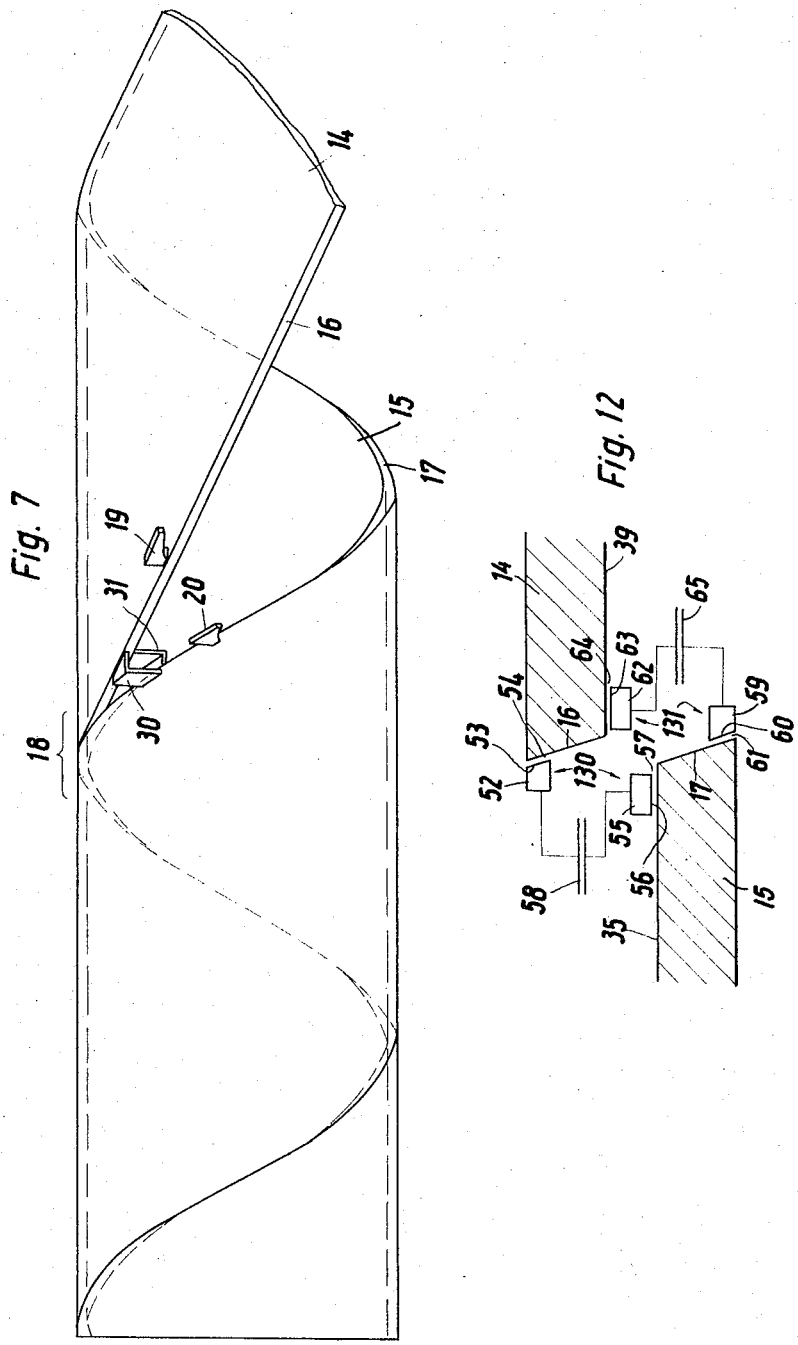
FIG. 7 shows schematically in a perspective view the spatial location of the electrical contacts and of the electrodes in relation to the metal band in a first embodiment.
Figure 8:
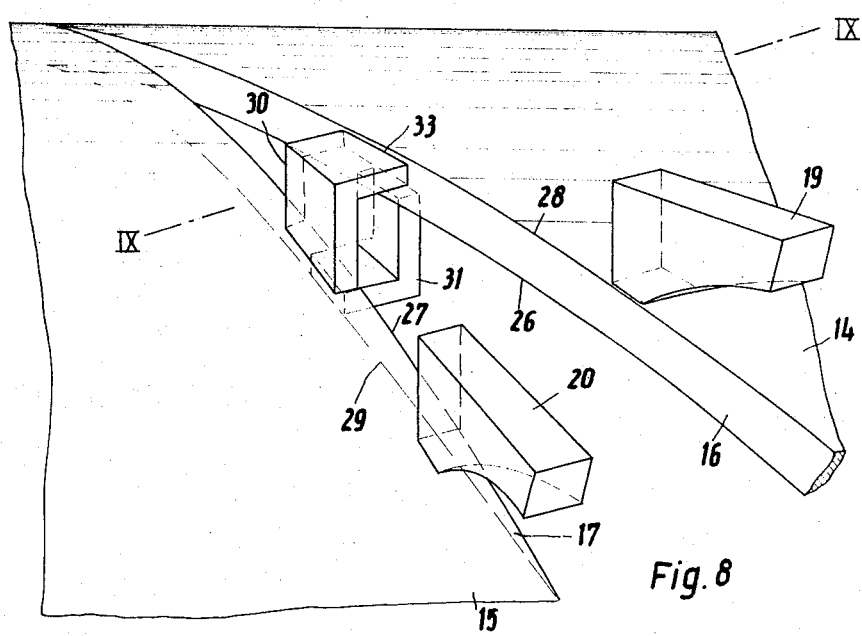
FIG. 8 shows a portion of FIG. 7 in enlarged scale.
Figure 11:
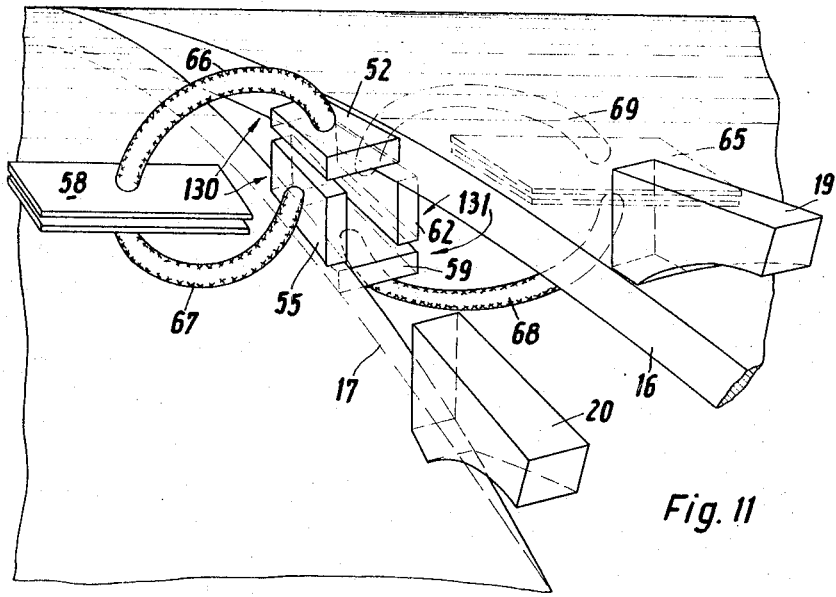
Figure 9:
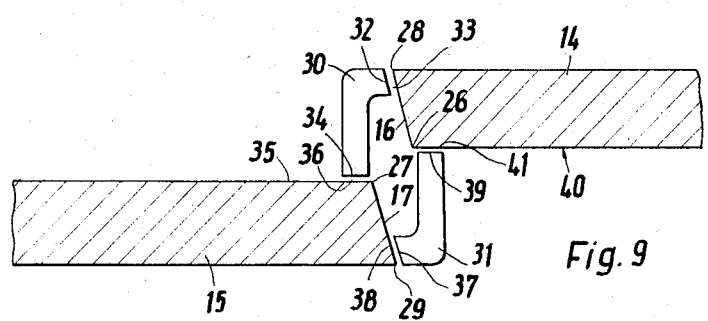
FIG. 9 shows a section in a plane defined by line IX—IX of FIG. 8.
Figure 10:
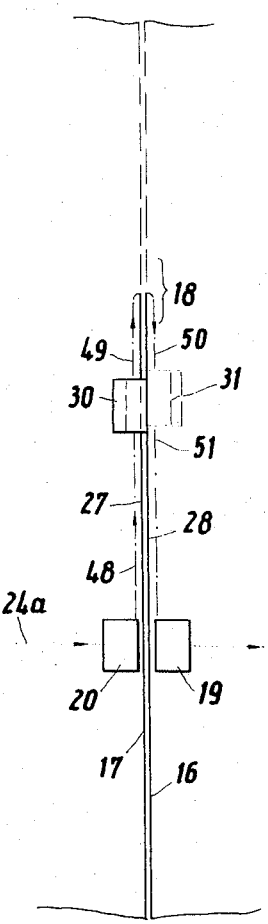

FIG. 10 indicates schematically the flows of electrical current in the embodiment illustrated in FIGS. 7 to 9;

FIG. 11 is a perspective view, similar to that of FIG. 8, of another embodiment of the invention, and, FIG. 12 is a partial sectional view, similar to that of FIG. 9, in a plane defined by line XII—XII in FIG. 11.

The same reference numerals indicate the same or equivalent parts in all figures of the drawing.

Figure 1:
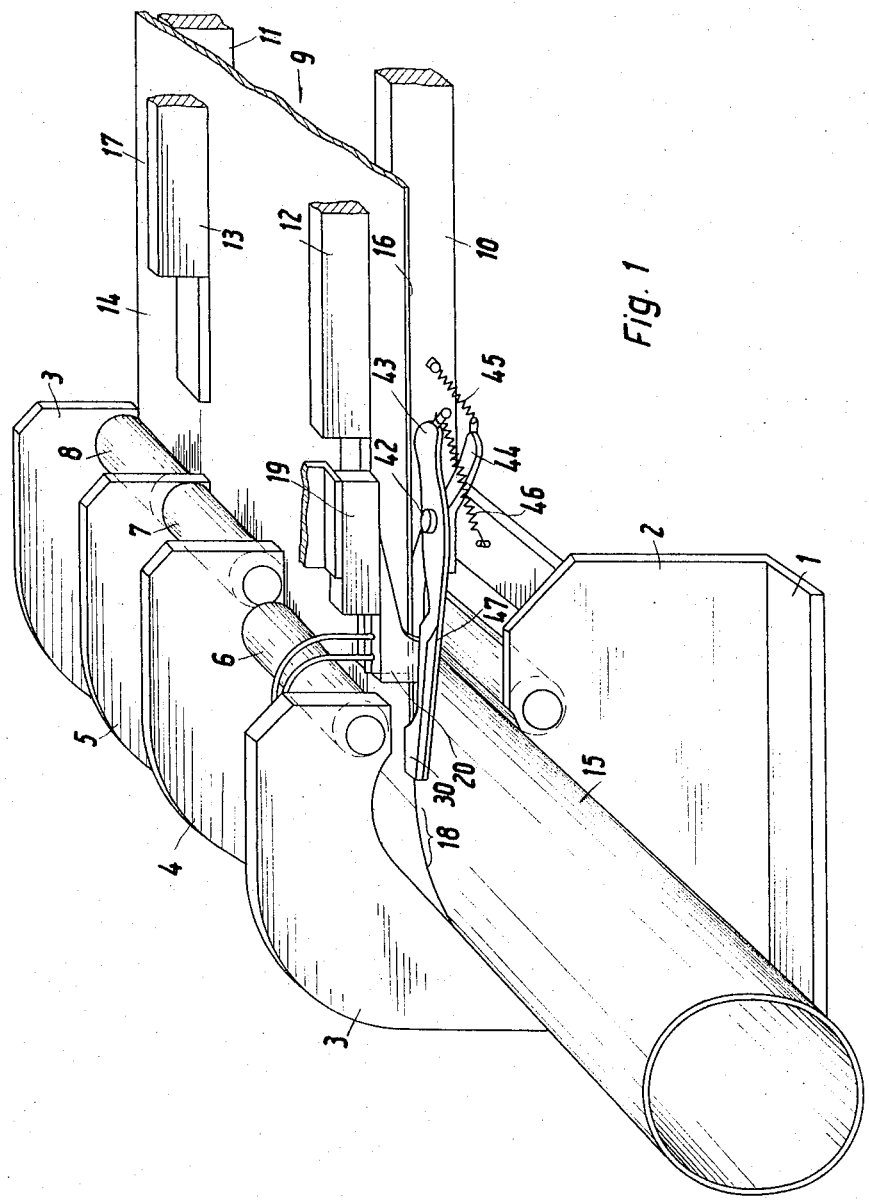
FIG. 1 is a simplified perspective showing of an apparatus in accordance with our invention for the resistance welding of a tube helically wound from a metallic band.

A machine for the manufacture of a helically seamed pipe as illustrated in FIG. 1 includes a frame of which only a base plate 1 and vertical supporting plates 2 and 3 are shown. Other vertical plates 4 and 5 are firmly connected to said frame at not visible places. Each pair of said plates supports a roller 6, 7, 8, respectively, which turn about horizontal axles. Said rollers serve to helically wind a band of sheet metal into a helically seam-welded pipe as known in the art. The metal band 9 moves between the lower guide bars 10 and 11 and the upper guide blocks 12, 13, all of which are firmly connected to the machine frame. The connections for the guide bars 10, 11 are not visible being hidden by the band 9 and the holding means for the guide blocks 12, 13 are omitted in order to show more important parts.

The metal band 9 moves into and through the machine in the direction of the shown arrow and comprises the incoming band portion 14 and the outgoing helically wound band portion 15. To form a continuous tube the seam formed by the two narrow side faces 16 and 17 has to be welded. This welding takes place near the spot where the two side faces 16, 17 meet for the first time that is within the zone 18. When reaching this zone 18 the side face 17 has already passed an essentially longer distance than the side face 16 the difference of these distances being equal to the length of one turn of the helical welding seam.

Associated with the machine illustrated in FIG. 1, namely to the right thereof, is a conventional conveyor (not shown) feeding the metal band into and through the machine to form the tube.

In the welding operation alternating current of radio frequency is used. This current is supplied to the metal band 9 by two contacts 19, 20 which touch the broad top face of the band 9 close to the edges of its narrow side faces 16 and 17 (see FIGS. 2 and 7). Both contacts are situated at a certain distance from the proper welding zone 18. In FIG. 1 only contact 19 is fully shown, while only the upwardly extending portion of contact 20 is seen. Both contacts are cooled, for example with water, during the welding operation. The contacts 19, 20 are provided with flaps 22 and 23, respectively, which receive the current feed lines 24, 25.

When working with alternating current of radio frequency of about 450 k.c.p.s., the electrical and magnetic field effects (skin effect, proximity effect and others) are so strong that the flow of current is limited to narrow strips along the side faces 16, 17 of the metal band extending between the contacts 19, 20 and the welding zone 18. Consequently, the beforesaid narrow strips are brought to the required welding heat, which for steel conforms to bright red glow and the two side faces 16, 17 upon contact under certain pressure flow into each other, the other zones of the band remaining cold. To attain said certain pressure many measures have been suggested. In the embodiments herein described the two side faces 16, 17 slope against the broad faces of the band 9 under angles somewhat differing from 90 degrees.

The before described known method for the welding of helically seamed tubes has disadvantages which will be hereinafter explained.

Figure 2:
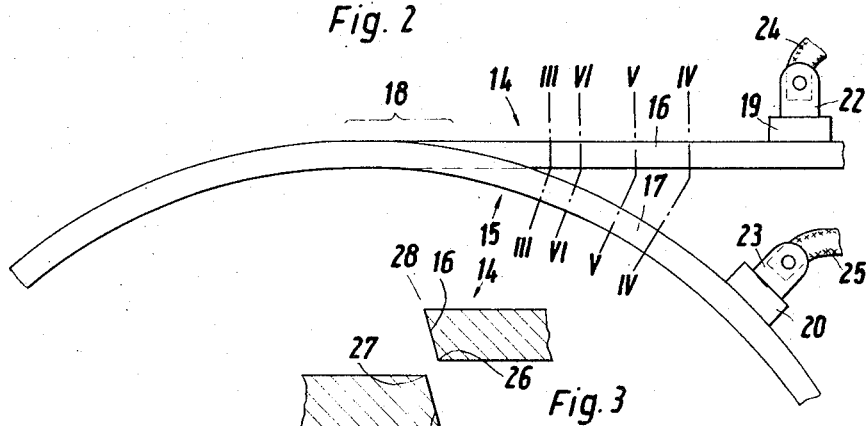
FIG. 2 shows schematically the incoming and the tubularly bent portions of the metal band as it runs towards the welding zone and the contacts for the welding current.
Figure 3:
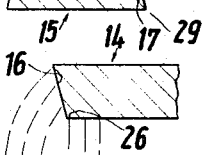
FIGS. 3 to 6 show in an enlarged scale sections along lines III—III, IV—IV, V—V, and VI—VI of FIG. 2, respectively.

FIG. 3 shows in an enlarged scale a section through the band portions 14, 15 along line III—III of FIG. 2 and indicates the temperature conditions when welding with a machine schematically illustrated in FIGS. 1 and 2 and using alternating current having radio frequency. In such case the strongest heating occurs at the mutually approaching edges 26, 27 which will be red hot while the temperature considerably decreases towards the edges 28, 29. The glow will be dark intermediate the edges 27, 29 and 26, 28 and disappears completely at the edges 28, 29.

Figure 4:
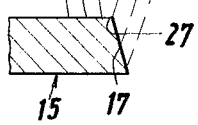
Figure 5:
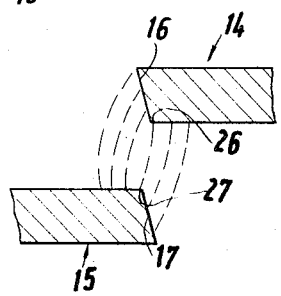

The inventors assume, without having any proof at this time, that the uneven and undesired distribution of temperature preventing a perfect welding is caused, at least partly, by the formation of an electric field between the band portions 14 and 15 which carries at the existing high frequencies a quite considerable capacitively passing current. This is allustrated in FIGS. 4 to 6 in which the dotted lines between the band portions 14, 15 show approximately the course of the electric field lines.

The measures hereinafter disclosed which embody our invention serve to eliminate the above described undesired distribution of temperature as illustrated in FIG. 3 and they cause, as experience showed, that in the welding zone 18 the narrow side faces 16, 17 to be united by welding glow bright-red evenly over their entire width at sufficiently even temperature.

In the embodiment shown in FIGS. 7 to 10 angular electrodes 30 and 31 are arranged between the welding zone 18 and each contact 19 and 20. The angular shape of these electrodes 30, 31 is apparent particularly from FIGS. 8 and 9. The electrode 30 has on one leg a frontal surface 32 which forces the narrow side face 16 of the band portion 14 and is separated therefrom by a narrow air gap 33 which can be reduced to zero as will be later explained. The other leg of this electrode 30 contains the frontal surface 34 which faces the outer surface 35 of the band 15 leaving therebetween an air gap 36 which also can be reduced to zero. However, the said air gaps 33 and 36 may never be eliminated at the same time.

The electrode 31 is constructed like electrode 30. It has on one leg a frontal surface 37 which faces the narrow side face 17 of the band portion 15 leaving a narrow air gap 38 inbetween and in its other leg has a frontal surface 39 which faces the inner surface 40 of band portion 14 leaving therebetween an air gap 41 which also may be reduced to zero. Again, however, the air gaps 38 and 41 may not be so reduced at the same time.

The effect aspired by our invention will increase as the said surfaces 34 and 39 of the electrodes 30, 31 are placed closer to the edges 27 and 26 of the band portions 14, 15 respectively. Particularly it was found advantageous to make the said frontal surfaces 32, 37 in the electrodes 30, 31 facing the seam forming surfaces 16, 17 narrower than the latter and to place the surface 32 closer to the outer edge 28 and accordingly the surface 37 closer to inner edge 29 as shown in FIG. 9.

It is recommended to avoid the air gaps 33 and 38 and to let the surfaces 32 and 37 directly contact the side faces 16 and 17 as shown in FIG. 1. In this embodiment each electrode 30, 31 forms the head of the arm of one of two pincerlike combined levers which turn about pivot 42. The right ends 43 and 44 of the levers are held by tension springs 45 and 46, respectively. In FIG. 1 only lever arm 47 holding electrode 30 is visible. The said springs 45, 46 cause the electrodes 30, 31 to contact the side faces 16, 17 regardless of any variations of the width of the metallic band 9 and of arising bends thereof.

FIG. 10 to be read in combination with FIG. 9 attempts to illustrate schematically in a top view how the effect desired by the invention is achieved. The outer edges 27 and 28 of the narrow side faces 16 and 17 of the band 9 are shown slightly distanced to make the figure better understandable though in fact they lie in the same plane and in and behind the welding zone 18 are united to a weld indicated by the dotted lines in the upper part of the figure. FIG. 10 shows also the electric contacts 19 and 20 and the electrodes 30 and 31. To simplify the showing these electrodes, as assumed above, are located close to the narrow side faces 16 and 17 of the band portions 14 and 15. The dash-dot lines 24a and 25a indicate the leads to the contacts 19 and 20 and the dash-dot lines 48 and 51 the path of electric current along the side faces 16 and 17. The current flows from contact 20 along path 48 to the electrode 30 where a branching off occurs. A part of the current, presumably the greater part, continues to flow along path 49 to the welding zone 18 and returns along the paths 50 and 51, passing electrode 31, to the contact 19. The other part of the current branches off in the electrodes 30, 31, flows directly from the side face 17 to the side face 16 and does not reach the welding one 18. The branched off current passes at least one air gap having capacitive impedance and thus is a capacity current as explained before.

In the embodiment illustrated in FIGS. 7 to 10 the effect achieved by our invention depends to a certain degree on the width of the air gap. Thus the effect can be regulated by suitably adjusting the width of the air gap; this however, may sometimes be quite difficult. Any such difficulties can be avoided by the embodiment illustrated in FIGS. 11 and 12 which will be hereinafter described.

Figure 6:
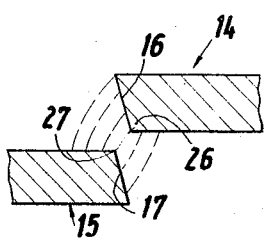

Each of the electrodes 130 and 131, which correspond to the earlier mentioned electrodes 30 and 31 shown in FIGS. 6 to 8, comprises two parts. Thus electrode 130 is composed of parts 52 and 55. The part 52 faces with its surface portion 53 the narrow side face 16 of the incoming band portion 14 with an intermediary air gap 54. The part 55 faces with its surface portion 56 the surface 35 of the wound band portion 15 also leaving an intermediary air gap 57. In this embodiment the two air gaps 54 and 57 may, however, be avoided and said surfaces may be in direct contact. This, of course, represents a great advantage.

The electrode components 52 and 53 are connected over a condenser 58 which replaces one or both air gaps 33, 36 of the embodiment shown in FIGS. 7 to 10. While it may be difficult to adjust the width of said air gaps 33, 36 there will be no difficulty to adjust the condenser 58 to provide at least approximately the best possible working conditions.

The other electrode 131, which corresponds to the earlier mentioned electrode 31 shown in FIGS. 6 to 8, is similar to electrode 130. Its component part 59 faces with a surface portion 60 the side face 17 of the band portion 15 leaving an intermediary air gap 61 and its component part 62 faces with its surface portion 63 the broad surface 39 of band portion 14 also leaving an intermediary air gap 64. Again these air gaps 61 and 64 may be avoided and said surfaces may be in direct contact. The parts 59 and 62 of electrode 131 are connected over condenser 65 which functionally corresponds to the condenser 58.

The perspective illustration of the machine in FIG. 11 shows the electrical connections 66 and 67 between the electrode components 52 and 55 and the condenser 58 as well as the electrical connections 68 and 69 between the electrode components 59 and 62 and the condenser 65.

It will be understood that the embodiments shown in FIGS. 7 to 10 and in FIGS. 11 and 12, respectively, can be used alternately. Thus electrode 30 can be replaced by electrode 130 while electrode 31 is retained, or electrode 31 can be replaced by electrode 131 while electrode 30 is retained.

While specific embodiments of our invention have been shown and described in detail to illustrate the application of the principles of our invention, it will be understood that the same may be otherwise embodied without departing from such principles and without avoiding the scope of our claims.

What we claim as our invention is:

1. In an apparatus for resistance welding the helical seam of a metal band helically wound into tubular shape the improvement comprising in combination means continuously helically winding a metal band having a top face, a bottom face and two narrow longitudinal side faces forming a top edge with said top face and a bottom edge with said bottom face; at least two electrical contacts for an alternating welding current of radio frequency, each contact touching the band near one of the approaching side faces at a distance from their meeting in the welding zone; first means branching off part of the welding current at a point intermediate said welding zone and at least one of said contacts; and second means transforming the thus branched off current into a capacity current and carrying the current thus branched off near one side face to the other side face.

2. An apparatus according to claim 1 wherein the said first and second means comprise at least one substantially two-armed electrode, the end face of one arm facing one side face of the band and the end face of the associated other arm the respective branching off point.

3. An apparatus according to claim 2 wherein said end face is narrower than the opposing side face and is off-center thereof nearer to the said top edge and said bottom edge, respectively.

4. An apparatus according to claim 2 comprising an air gap within at least one of said first and second means for transforming the branched current into a capacity current.

5. An apparatus according to claim 1 wherein said second means transforming the branched off current comprises a capacitance.

6. An apparatus according to claim 2 wherein the two arms of the electrode are separated and electrically connected over a condenser.

References Cited by the Examiner

UNITED STATES PATENTS

| | | | |
|---|---|---|---|
| 2,873,353 | 2/1959 | Rudd | 219—62 |
| 2,876,323 | 3/1959 | Rudd | 219—8.5 |
| 3,122,624 | 2/1964 | Domizi | 219—8.5 |

RICHARD M. WOOD, *Primary Examiner.*